United States Patent [19]

Wagner et al.

[11] 3,931,112

[45] Jan. 6, 1976

[54] PROCESS FOR N-METHYLOLATING DIISOCYANATE POLYADDITION PRODUCTS

[75] Inventors: Kuno Wagner, Leverkusen-Steinbuechel; Hans Jürgen Müller, Cologne, both of Germany

[73] Assignee: Bayer Aktiengesellschaft, Leverkusen Bayerwerk, Germany

[22] Filed: Feb. 22, 1974

[21] Appl. No.: 444,628

[30] Foreign Application Priority Data
Feb. 28, 1973 Germany............................ 2309862

[52] U.S. Cl.......... 260/72 B; 260/30.4 N; 260/31.6; 260/33.4 UR; 260/33.6 UB; 260/33.8 UB; 260/69 R; 260/849; 428/425
[51] Int. Cl.².................... C08G 12/20; C08K 5/05
[58] Field of Search .... 260/72 B, 72 R, 69 R, 70 R, 260/849

[56] References Cited
UNITED STATES PATENTS

| | | | |
|---|---|---|---|
| 3,087,912 | 4/1963 | Wagner et al. | 260/849 |
| 3,242,230 | 3/1966 | Habib | 260/849 |
| 3,384,606 | 5/1968 | Dieterich et al. | 260/849 |
| 3,427,272 | 2/1969 | Bolinger et al. | 260/72 |
| 3,442,843 | 5/1969 | Keberle et al. | 260/849 |
| 3,491,067 | 1/1970 | Sellet | 260/849 |

*Primary Examiner*—John C. Bleutge
*Attorney, Agent, or Firm*—Lawrence S. Pope

[57] ABSTRACT

Formaldehyde and a polyaddition product of an organic diisocyanate and an organic compound having hydrogen atoms determinable by the Zerewitinoff method are reacted in a mixture of a tertiary alcohol and an inert organic solvent to form N-methylolated diisocyanate polyaddition products for use, inter alia, as coatings, lacquers and the like.

9 Claims, No Drawings

PROCESS FOR N-METHYLOLATING DIISOCYANATE POLYADDITION PRODUCTS

This invention relates generally to diisocyanate polyaddition products and more particularly to a process for making predominantly linear N-methylolated diisocyanate polyaddition products which are soluble in organic solvents and stable in storage and to lightfast coatings, lacquers, impregnations, leather dressing or microporous films made therefrom.

Numerous processes are already known for producing high molecular weight, non-crosslinked diisocyanate polyaddition products which are soluble in organic solvents and suitable for coating purposes. These polymers are generally produced from higher molecular weight dihydroxy compounds, organic diisocyanates and chain lengthening agents such as water, diamines, hydrazine, hydrazine hydrate, hydrazine derivatives, carbodihydrazide, etc., for example by the processes described in German Auslegeschriften Nos. 1,048,408; 1,122,254; 1,183,196; 1,278,687; 1,184,947 and 1,184,984 and German Offenlegungsschrift No. 2,015,603. High molecular weight diisocyanate polyaddition products which are soluble in so-called soft solvent mixtures of aromatic solvents such as benzene, toluene or xylene with primary or preferably secondary alcohols such as isopropanol or isobutanol can be produced in this way from higher molecular weight organic α,ω-dihydroxy compounds, aliphatic or cycloaliphatic diisocyanates such as 1-isocyanato-3,3,5-trimethyl-5-isocyanatomethylcyclohexane, hexamethylene diisocyanate, m-xylylene diisocyanate, p-xylylene diisocyanate or 4,4'-diisocyanatodicyclohexylmethane and chain lengthening agents such as 1-amino-3,3,5-trimethyl-5-aminomethylcyclohexane, 4,4'-diaminocyclohexane, m-xylylene diamine, p-xylylene diamine, lysine methyl esters, hexamethylenediamine, hydrazine hydrate or carbodihydrazide. These polyurethanes are particularly suitable for the purposes mentioned above because they can be used without physiologically harmful solvents such as dimethyl formamide. In addition, they have excellent physical properties and are very lightfast but they are very sensitive to chemical cleaning processes because they swell or partly dissolve in alcohols as well as in aromatic compounds and are completely soluble in mixtures of aromatic compounds and alcohols.

Attempts have therefore been made to effect crosslinking of the polyaddition products of the films or coatings after they have been produced by incorporating additional reactive groups into the polyurethane molecule and thereby increase the resistance to solvents. Apart from the known reactions with excess polyisocyanate to form biuret and allophanate groups, the most suitable solution to this problem appeared to be a method of effecting cross-linking of the polyaddition product with the aid of formaldehyde or substances which split off formaldehyde.

Extensive analytical investigations showed, however, that the above mentioned technically extremely interesting lightfast diisocyanate polyaddition products based on aliphatic or cycloaliphatic diisocyanates and diamines could not be converted into N-polymethylol compounds even under the most severe conditions (even at high temperatures and in the presence of basic N-methylolating catalysts) if they were dissolved in the conventional solvent mixtures of aromatic solvents and primary or secondary alcohols heretofore used, and therefore could not be corss-linked by way of N,N'-methylene bridges or N,N'-methylene ether segments. When Lemme's method of formaldehyde titration [Chem. Ztg. 27, 896 (1903), Chem. Zentralblatt (1903), II, 911] was carried out after attempts at methylolation, the formaldehyde content was invariably found to be practically unchanged. Polyurethane films which have been treated in this way are therefore just as soluble, for example in mixtures of aromatic solvents and alcohols or in dimethylformamide, as before the treatment and equally liable to swell in alcohols. Diisocyanate polyaddition products dissolved in so-called soft solvent systems, which are particularly suitable for producing coatings and lacquers, therefore cannot be made to undergo N-methylolation reactions. More detailed analytical invetigations indicate that the main reason for this is the unfavorable equilibrium for the methylolation of urethane or urea groups in the presence of primary or secondary alcohols in accordance with equation a) or b):

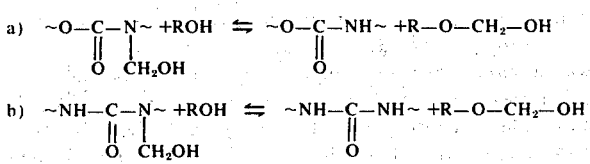

At pH values above 7, the equilibrium is always more than 99% on the right hand side of the equation, i.e. on the side of the free semiacetals. If, on the other hand, the reaction is carried out at pH values below 7, in other words in an acid madium, then formaldehyde is bound as a complete acetal R—O—CH$_2$—OR. Such complete acetals are no longer capable of methylolating urethane or urea groups.

The surprising finding that diisocyanato polyaddition products which contain groups which are normally quite readily methylolated, e.g. the following groups

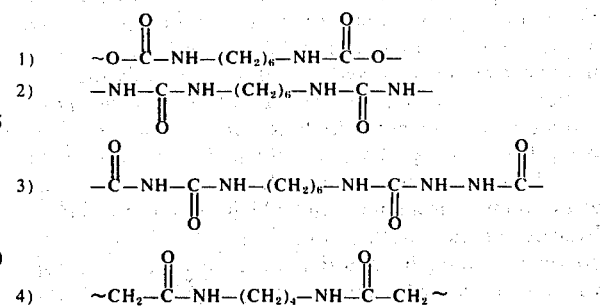

will not react with formaldehyde or reagents which split off formaldehyde if they are dissolved in solvents which contain primary or secondary alcohols is utilized according to an earlier proposal for mixing such solutions of lightfast diisocyanatopolyaddition products with reactive semiacetals. In this way it is possible to prepare mixtures which are completely stable in storage for unlimited periods of time so that their semiacetal content remains constant. By virtue of their undiminished semiacetal content, they are highly reactive with basic amino groups present in leather, gelatine, etc. and are therefore suitable for use as leather coatings and leather finishes which render the leather easy to care for. These films and coatings which have excellent mechanical properties however still have the disadvantage of undergoing severe swelling in aromatic solvents or alcohols and completely dissolving in dimethylformamide and mixtures of aromatic solvents and alcohols.

Apart from these difficulties of methylolating the technically interesting systems of soft solvents and polyurethanes based on aliphatic or cycloaliphatic diisocyanates and chain lengthening agents, no other processes have previously become known for preparing sotrage stable solutions of diisocyanate polyaddition products which contain N-methylolurethane, N-methylolurea, N-methylolamide or N-methylolhydrazodicarbonamide groups which are capable of being cross-linked.

It is therefore an object of this invention to provide a novel process for N-methylolating organic diisocyanate polyaddition products. Another object of the invention is to provide storage stable solutions of diisocyanate polyaddition products which contain N-methylolurethane, N-methylolurea, N-methylolamide and/or N-methylolhydrazodicarbonamide groups which are capable of being cross-linked. A further object of the invention is to provide coatings, lacquers, impregnations, leather dressings, microporous films and the like containing organic diisocyanate polyaddition products which have improved solvent resistant properties. A still further object of the invention is to provide high molecular weight polyurethanes, polyurethane-ureas, polyurethane polyamides, polyurethane-polyurea-polyhydrazodicarbonamides and polyurethane-polyhydrazodicarbonamides which are substantially linear or non-crosslinked, soluble in soft solvent mixtures of alcohols and aromatic solvents and easily cross-linked whenever desired into products which are substantially resistant to swelling in aromatic solvents and substantially insoluble in dimethylformamide and mixtures of aromatic solvents and alcohols.

The foregoing objects and others are accomplished in accordance with this invention, generally speaking, by providing a method for making a high molecular weight substantially non-crosslinked N-methylolated polymer containing groups formed by reaction of an isocyanato group and a group of an organic compound containing a hydrogen atom determinable by the Zerewitinoff method with formaldehyde in solution in a mixture of a tertiary alcohol and an organic solvent for the non-cross-linked polymer which is substantially inert to isocyanato groups. The formaldehyde may be mixed with the substantially non-crosslinked polymer as a gas, as formalin or as a compound which releases formaldehyde under the reaction conditions. The groups in the polymer formed by reaction of an isocyanato group with a reactive hydrogen atom of an organic compound may be urethane, urea, amide, hydrazodicarbonamide or the like.

It has now surprisingly been found that high molecular weight, N-methylolated organic diisocyanate polyaddition products, such as, polyurethanes, poly ureas, polyurethane polyamides, polyurethane-polyurea-polyhydrazodicarbonamides or polyurethane-polyhydrazodicarbonamides can be prepared rapidly and reproducibly, in some cases with very high urea and/or hydrazodicarbonamide concentrations, by reacting solutions of these polyaddition products with semiacetals, gaseous formaldehyde, formalin solutions or other formaldehyde releasing substances in the presence of tertiary alcohols.

The products obtained are readily soluble and completely free from cross-linking and can therefore also be shaped by thermoplastic processing or made into films from their solutions. They may be cross-linked at a later date whenever desired.

This invention therefore relates to a process for the production of N-methylolated diisocyanate polyaddition products which are stable in storage, characterized in that the polyaddition products dissolved in a mixture of inert solvents and tertiary alcohols are reacted with semiacetals of formaldehyde, formalin solution, paraformaldehyde or any other suitable formaldehyde releasing agents at any suitable reaction temperature of say −20°C to 160°C, preferably 20°C to 70°C, if desired in the presence of basic inorganic or organic methylolating catalysts.

The process according to the invention can be applied to any organic diisocyanate polyaddition product and invariably insures reliable methylolation and the formation of products which are stable in storage.

Polyaddition products suitable for the process according to the invention are obtained in known manner from higher molecular weight polyhydroxyl compounds, preferably difunctional polyesters or polyethers which contain terminal alcoholic hydroxyl groups and have molecular weights of at least about 400, usually between about 400 and about 8000, and preferably between about 800 and about 2500, or from the corresponding dihydroxypolyacetals or dihydroxypolycarbonates, diisocyanates and chain lengthening agents. Examples of such suitable higher molecular weight dihydroxyl compounds commonly used in polyurethane chemistry may be found inter alia in Kunststoff-Handbuch, Volume VII, "Polyurethane", Carl Hanser-Verlag, Munich, (1966), pages 47–74. Besides or instead of the aforesaid polyhydroxyl compounds, higher molecular polyamines, preferably diamines with a molecular weight of between about 800 and 2500, may be used to synthesize the polyaddition products suitable for the process according to the invention. Compounds of this kind are described e.g. in U.S. Pat. Nos. 2,888,439, 3,184,502 and 3,248,424 and in Canadian Pat. No. 784,293.

The diisocyanates used for synthesizing the polyaddition products which are to be methylolated according to the invention may be any suitable aliphatic, cycloaliphatic, araliphatic or aromatic diisocyanate. The following are examples: tetramethylene-1,4-diisocyanate, pentamethylene-1,5-diisocyanate, hexamethylene-1,6-diisocyanate, 2,4,4-trimethyl-hexamethylene-1,6-diisocyanate, dodecamethylene-1,12-diisocyanate, 1,2-diisocyanatomethyl-cyclobutane, dicyclohexane-4,4'-diisocyanate, α, ε-diisocyanato-caprioc acid esters containing 1 – 8 carbon atoms in the alcohol group, dicyclohexylmethane-4,4'-diisocyanate, p-xylylene diisocyanate, m-xylylene diisocyanate, 1-isocyanato-3,3,5-trimethyl-5-isocyanato-methylcyclohexane, 1-methyl-2,4-diisocyanatocyclohexane and its isomers, tolylene-2,4-diisocyanate, tolylene-2,6-diisocyanate, 4,4'-diisocyanatodiphenylmethane, 4,4'-diisocyanatodiphenylether, naphthylene-1,5-diisocyanate, NCO telomers of these diisocyanates such as those described in French Patent Specification No. 1,593,137, in particular those of hexamethylene diisocyanate or 1-isocyanato-3,3,5-trimethyl-5-isocyanatomethylcyclohexane with vinyl acetate, vinyl chloride, styrene, methyl acrylate, methylmethacrylate or butyl acrylate. Diisocyanates which contain semicarbazide groups such as those disclosed in German Offenlegungsschrift No. 1,720,711 are also suitable, in particular those of 2 mols of hexamethylene diisocyanate or 1-isocyanato-3,3,5-trimethyl-5-isocyanatomethyl-cyclohexane and 1 mol of N,N-dimethylhydrazine. Mixtures of diisocyanates may also be used.

To prepare the polyaddition products, which can be N-methylolated, the low molecular weight diisocyanates and high molecular weight dihydroxyl compounds are usually first reacted together in known manner, using an NCO/OH ratio of 1.5 to 3 and preferably 1.8 to 2, to produce prepolymers which contain terminal isocyanate groups. The subsequent reaction of these higher molecular weight compounds which contain terminal isocyanate groups with chain lengthening agents may be carried out either solvent-free or in solution at temperatures of 50°C to 140°C, preferably 5°C to 40°C. It may be advantageous to carry out this reaction by adding a measured quantity of the higher molecular weight diisocyanate, optionally together with a 1 to 6 times molar quantity of monomeric diisocyanate, to the liquid or dissolved chain lengthening agent but the process may also be carried out conversely by adding the chain lengthening agent to the other reactant or reactants. If NCO is used in excess, polyaddition products with free NCO groups are first formed in the reaction mixture, and these are subsequently bound by impurities of the solvent etc., i.e. by chain breaking reactions. If it is desired to obtain very high molecular weight polyaddition products, however, it is preferred to use equimolar ratios of NCO prepolymer and chain lengthening agent.

The polyaddition products which can be methylolated in accordance with the invention are preferably prepared in the presence of an organic solvent which is inert thereto, such as acetone, methyl ethyl ketone, methylene chloride, chloroform, perchloroethylene, methyl isopropyl ketone, benzene, toluene, xylene, ethyl acetate, butyl acetate, methyl glycol acetate, ethyl glycol acetate, tetrahydrofuran or the like, or in mixtures of these solvents.

Any suitable chain lengthening agent may be used for preparing the polyaddition products to be methylolated according to the invention such as, for example, water or diols with a molecular weight of up to 400 such as ethylene glycol, diethylene glycol, triethylene glycol, propane-1,3-diol, propane-1,2-diol, butane-1,4-diol, thiodiglycol, hexane-1,6-diol, octane-1,8-diol, dodecane-1,12-diol, 1,4-dimethylol benzene, and the like. The following are examples of hydrazines and diamines which are suitable chain lengthening agents: hydrazine hydrate, hydrazine, N-methylhydrazine, N,N-dimethyl-hydrazine, N,N-diethyl-hydrazine, ethylene diamine, trimethylene diamine, 1,2-diaminopropylene diamine, tetramethylene diamine, N-methylpropylene-1,3-diamine, pentamethylenediamine, trimethylhexamethylenediamine, hexamethylene diamine, octamethylenediamine, undecamethylene diamine, diaminomethylcyclobutane, 1,4-diaminocyclohexane, 1,4-diaminodicyclohexylmethane, 1-methyl-2,4-diaminocyclohexane, 1-methyl-2,6-diaminocyclohexane, m-xylylenediamine, 1-amino-3,3,5-trimethyl-5-aminomethyl-cyclohexane, p-aminobenzylamine, 3-chloro-4-aminobenzylamine, hexahydrobenzidine, 2,6-dichloro-1,4-diaminobenzene, p-phenylenediamine, tolylene-2,4-diamine, 1,3,5-triisopropyl-phenylene-2,4-diamine, 1,3,5-trimethylphenylene-2,4-diamine, 1-methyl-3,5-diethylphenylene-2,4-diamine, 1-methyl-3,5-diethyl-phenylene-2,6-diamine, 4,4'-diaminodiphenylmethane, 4,4'-diaminodiphenyl ether and the like. Particularly preferred hydrazines and amines are hydrazine hydrate, N,N-dimethylhydrazine, 1-amino-3,3,5-trimethyl-5-aminomethyl-cyclohexane, hexamethylenediamine, m-xylylenediamine, 4,4'-diaminodicyclohexylmethane, lysine methyl ester, trimethylhexamethylene diamine and 1-methyl-2,4-diaminocyclohexane.

The activated chain lengthening agents described in German Offenlegungsschrift Nos. 2,062,289 and 2,062,288 are also very suitable for preparing the polyaddition products which can be methylolated according to the invention. These chain lengthening agents are addition products of lactam and water or addition products of lactam and difunctional alcohols, diamines or hydrazines. The reactivity of the chain lengthening agents with isocyanates is substantially increased by the formation of addition products with lactams. This high reactivity enables high molecular weight, unbranched or substantially linear chain molecules to be produced since the reaction velocity of NCO groups with activated chain lengthening agents is many times higher than the reaction velocity with urethane or urea groups. This last mentioned reaction which leads to chain branching is therefore completely suppressed in favor of the chain lengthening reaction.

The activated chain lengthening agents are prepared by simply mixing the lactam, e.g. ϵ-caprolactam, with the given chain lengthening agent at temperatures of between 0°C and 100°C, preferably between 30°C and 70°C. This reaction generally results in liquids which have remarkably low viscosities even at room temperature.

Using these activated chain lengthening agents enables polyaddition products to be prepared even without the addition of catalysts, in particular without metal compounds such as tin-II (stannous) and tin-IV (stannic) salts, even if a very inert polyisocyanate is used such as 1-isocyanato-3,3,5-trimethyl-5-isocyanatomethyl-cyclohexane

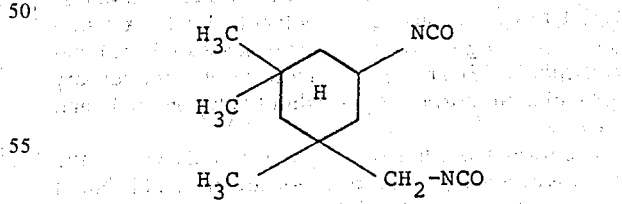

in which the NCO group attached to the secondary carbon atom is very slow to react. Because the reaction can be carried out without the above mentioned catalysts, polyaddition products with improved age resistance, resistance to hydrolysis and resistance to oxidation can be obtained.

The activated chain lengthening agents have the advantage of generally being low viscosity liquids which are very highly soluble in various organic solvents, in polyisocyanates and NCO prepolymers and in the polyhydroxyl compounds used for diisocyanate polyaddition reactions and are therefore homogeneously miscible with all these substances to that uniform progress of the polyaddition reaction is insured.

In its broadest aspects the invention contemplates the use of any suitable organic polyol, organic diisocyanate and chain lengthening agent including those disclosed by Saunders and Frisch in "*Polyurethanes: Chemistry and Technology*" published by Interscience Publishers, the disclosure of which is incorporated herein by reference.

Any inert organic solvent for the diisocyanate polyaddition product prior the methylation which does not contain any groups capable of reacting with isocyanates may be used in practicing the invention. It is preferred to use organic solvents which are not highly polar, i.e. which are substantially non-polar, such as benzene, toluene, xylene, ethyl benzene, chlorobenzene, tetrahydrofuran, dioxane, 1,3-dioxolane, glycol carbonate, ethyl glycol acetate, methylene chloride, chloroform or trichloroethylene but highly polar solvents such as dimethylacetamide, dimethyl formamide or tetramethylurea may also be used.

Any suitable tertiary alcohol may be used in the solvent mixture according to the invention but the preferred one is tertiary butanol, other suitable tertiary alcohols include e.g. diacetone alcohol, 2-methyl-2-butanol, 2-methyl-2-pentanol, 3-methyl-3-pentanol, 3-ethyl-3-pentanol, 3-ethyl-3-nonanol, 1-methylcyclopentanol, 1-methyl-cyclohexanol or 1-ethylcyclohexanol or mixtures thereof.

The tertiary alcohol may be used in any suitable quantity such as from 5 to 95% by weight, based on the quantity of solvent mixture. The solvent mixture preferably contains from 10 to 90% by weight and more particularly 20 to 50% by weight of tertiary butanol.

In the process provided by the invention, pulverulent or rubber-like, solid diisocyanate polyaddition products may be dissolved in the above mentioned solvent mixtures at any suitable temperature such as from 40° to 160°C, preferably 70° to 95°C to form approximately 20 to 50% by weight solutions which are then methylolated.

It is simpler and more economical, however, to propare the polyaddition products directly in the mixtures of inert solvents and tertiary alcohol and then add the N-methylolating reagents immediately after the polyaddition reaction. The solvent mixtures preferably used in this case are benzene/toluene/xylene/tert.butanol (1:1:1:1);xylene/toluene/tert.butanol (1:1:1); xylene/toluene/ethyl glycol acetate/tert.butanol (1:1:1:1) and particularly mixtures of toluene or xylene and tertiary butanol in proportions by weight of between 70:30 and 30:70.

The formaldehyde liberating compounds used in the process according to the invention are preferably liquid semiacetals of formaldehyde such as

```
CH₃—O—CH₂—OH
C₂H₅—O—CH₂OH
CH₃—CH₂—CH₂—O—CH₂OH
C₄H₉—O—CH₂OH
H₃C
   >HC—O—CH₂OH
H₃C
CH₃—O—CH₂—CH₂—O—CH₂OH
CH₂—O—CH₂OH
|

CH₂—O—CH₂OH
CH₂—O—CH₂OH
|
CH₂—OH
```

-continued

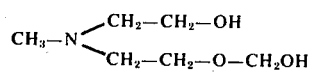

or 2% to 50% by weight formalin solutions or paraformaldehyde. Gaseous formaldehyde may also be used. N-methylol compounds of lactams such as butyrolactam, valerolactam or preferably N-methylolcaprolactam may also be used as compounds from which formaldehyde is liberated. It is often advantageous to use these compounds because transmethylolation to the high molecular substrate takes place via these compounds, and in hard films the resulting free ε-caprolactam fullfills the function of a valuable additive with plasticizing properties.

The N-methylolating catalysts which may be used in the process according to the invention are preferably sodium and potassium carbonate, alcoholates of sodium potassium and calcium, barium hydroxide, tertiary organic bases such as triethylamine, dimethylbenzylamine and endoethylene piperazine and hexahydrotriazines such as N,N',N''-trimethyl-hexahydrotriazine or the corresponding ethyl, n-propyl- or n-butylsubstituted triazines.

The temperature of the solution during methylolation is preferably between 20°C and 70°C. The quantities of formaldehyde or formaldehyde releasing substances used in the process according to the invention may vary within wide limits and depend mainly on the amount of urethane, urea, amide, and/or hydrazodicarbonamide groups in the high molecular weight polyaddition product. In general, 0.1 to 2 and preferably 0.3 to 1.5 equivalents of formaldehyde or formaldehyde releasing substances are used for one methylolatable NH equivalent. If the urea group concentration is high, however, it may be advantageous both for reasons of the velocity of the reaction and for increasing the solubility, to use up to 10 equivalents of formaldehyde per NH equivalent, especially when semiacetals are used as methylolating reagents because semiacetals are good solvents for diisocyanate polyaddition products and therefore insure uniform progress of the N-methylolating reaction.

The polyaddition products preferably used for the process according to the invention contain about 0.2 to 0.4 NH equivalents obtained from urea groups for every 200 parts by weight of polyaddition product. Preparation of such diisocyanatopolyaddition products is carried out in known manner as described above from α, ω-diisocyanatoprepolymers and chain lengthening agents such as water, diamines, hydrazine, hydrazine hydrate or hydrazine derivatives.

The semiacetals used for methylolation preferably have the following constitutional formulae

R—O—CH₂OH
R'—(O-CH₂OH)ₙ
(HOCH₂—O)ᵦ—R''—(OH)ₐ in which R represents an aliphatic, cycloaliphatic or araliphatic group which contains 1 to 20 carbon atoms and which may be unsaturated or substituted with oxygen or with ($C_1$–$C_{10}$) alkylated nitrogen atoms, R' represents an n-polyvalent, preferably 2- to 6-valent group containing 2 to 20 C atoms and R'' represents an (a + b)-polyvalent group containing 2 to 20 C atoms, where (a + b) is preferably a number between 2 and 4 and a may be a number between 1 and 3. Based on the quantity of dissolved diisocyanate polyaddition product, the dissolved methylolated products of the process contain at least 25% by weight of tertiary alcohols and 2 to 400% by weight, preferably 5 to 30% by weight of semiacetals.

Soluble, methylated, uncross-linked one-component polyaddition products which have very high concentrations (based on the solid polyaddition product) of urethane, urea and hydrazodicarbonamide groups can be produced by the process according to the invention. These products are free from gel particles and can be cross-linked whenever desired by way of their methylene or methylene ether groups. The process therefore enables the production in particular of lightfast products which are soluble in the conventional solvents used in the lacquer industry, leather industry and textile industry and which can be dissolved in mixtures of aromatic hydrocarbons such as benzene, toluene, xylene and the like and tertiary butanol (mixed in ratios of between 70:30 and 30:70) without the addition of dimethylformamide even if they contain high concentrations of urea groups (e.g. 5 to 9% by weight). The solutions are stable in storage and show no tendency to gel.

N-methylolated polyaddition products which contain high concentrations of urea or hydrazodicarbonamide groups are of great technical interest because these groups and particularly the urea group have a much stronger tendency than the urethane group to form hydrogen bridge bonds. Properties such as the mechanical strength, toughness and hardness of coatings are improved owing to the formation of super-structures (physical cross-linking) in the high molecular weight polyaddition product and moreover higher dimensional stabilities can be obtained in the finished cross-linked products.

The presence of tertiary alcohols increases the storage stability of these products which can be cross-linked. Secondary condensation of the N-methylol groups with each other in the solutions is substantially prevented.

Since the tertiary alcohols present are not capable of being acetalized, the products of the process remain undiminished in their reactivity for cross-linking reactions since both etherification reactions (formula 1) and decomposition of the methylol group with formation of acetal (formula 2) are impossible:

and epoxides. The polyaddition products produced by the process according to the invention can therefore be converted into highly cross-linked duroplastic resins by means of any suitable additional cross-linking reagent such as, for example, triisocyanates, dimeric diisocyanates, biuret triisocyanates of hexamethylene diisocyanate, trimerized hexamethylene diisocyanate and urea diisocyanates of 1-methylbenzene-2,4-diisocyanates or epoxides, and the like.

The N-methylolated polyaddition products obtainable by the process according to the invention can even be worked thermoplastically when they are in the form of powders or in a rubber-like form and they can therefore be converted into cross-linked shaped products by thermoplastic processes.

Aliphatic N-methylolated polyaddition products produced by the process according to the invention are distinguished by exceptionally high lightfastness, high elasticity and other properties which are advantageous for lacquers but polyaddition products produced from aromatic diisocyanates by the process according to the invention are also very suitable for use as binders for physically drying and crosslinkable lacquer systems, coatings, primers and dressings if they are not required to be lightfast.

The cross-linking reaction of the methylolated polyaddition products, which may be carried out whenever desired by any suitable process such as by the addition of acid catalysts, by heating or by adding a cross-linking agent, results in films or coatings which are exceptionally resistant to the usual solvents.

This invention therefore also relates to the use of solutions of methylolated diisocyanate polyaddition products obtainable by the process according to the invention for producing wetproof cross-linked coatings, lacquers, prints and impregnations on fibrous material or leather and in particular for priming and dressing natural or synthetic leather to produce easy-to-care finishes. To produce these finishes, the mixtures according to the invention are applied to any supports made of fibrous material or leather and the solvents are left to evaporate at room temperature or they may be evaporated by heating to temperatures of up to about 140°C.

The methylolated polyaddition products produced by

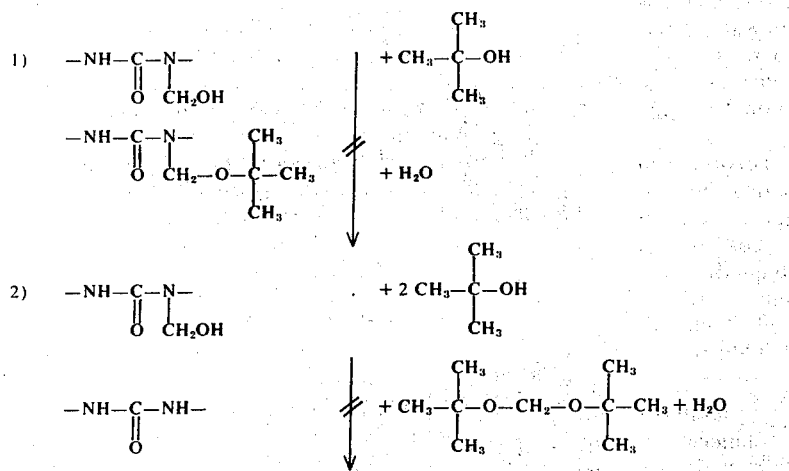

Moreover, in contrast to primary and secondary alcohols, the tertiary alcohols used according to the invention are very much less reactive with polyisocyanates the process according to the invention which are particularly suitable for use as lacquer binders and coating compounds are those which have been produced using 1-isocyanato-3,3,5-trimethyl-5-isocyanatomethylcyclohexane, m-xylylene diisocyanate, 4,4'-diisocyanatodicyclohexylmethane or 2,6-diisocyanato caproic acid ester or the vinyl telomers of these diisocyanates as the isocyanate components and chain lengthening agents such as water or the diamines corresponding to the above mentioned diisocyanates. Solutions of these methylolated polyaddition products in the mixtures of aromatic hydrocarbons and tertiary alcohols described above are distinguished by their waterclear color, they have no tendency to gel, their reactivity is preserved even after long times in storage and they have excellent film forming properties. Formation of the films is brought about on the one hand by physical drying due to evaporation of the solvent and on the other hand by the cross-linking reaction subsequently carried out, which sets in at room temperature and may be accelerated by heating to about 80° to 150°C. Lacquers of this type are particularly suitable for application as coatings which rapidly become surface-dry, especially for producing patent leather finishes and for coating synthetic resins, textiles and leather.

The solutions prepared according to the invention may, of course, also be mixed with other compounds for the purpose of obtaining special effects, for example the products of the process may be colored with soluble dyes or inorganic or organic pigments, and the usual fillers and matting agents such as silicic acid, aluminium silicates, talcum, kieselguhr or metal salts of fatty acids may also be added.

One property of the products which should be particularly mentioned is their good compatibility with other film-forming substances. This enables the properties of the coatings such as their handle, surface hardness or abrasion resistance to be varied by mixign the products with other film forming substances. Substances particularly suitable for this purpose are nitrocellulose, cellulose acetate, cellulose acetobutyrate and polyvinyl chloride copolymers. These film forming substances may also contain the plasticizers usually employed for them. The handle of coatings obtained from the products according to the invention may also be modified as desired by adding natural, semi-synthetic or synthetic or synthetic low molecular weight or high molecular weight compounds such as caprolactam, natural or synthetic waxes, natural resins, polymers which are soluble in organic solvents, silicone oils and alcohols with hydrocarbon chains containing about 8 to 20 carbon atoms. The flow and wetting properties of the solutions from which the coatings are applied may also be adjusted by the addition of conventional wetting agents.

If the methylolated products produced according to the invention are used on their own, coating the substrate is carried out in one or more applications. If several coats are applied, the first applications should be regarded as primers and may be adapted to the material of the substrate as regards fullness, sealing effect and softness. This can be achieved mainly by varying the concentration of the solution applied. The final coat applied then preferably consists of abrasion resistant, harder polyurethanes although the desired resistance to abrasion can also be achieved by addition of hard abrasion-resistant film forming substances.

The mixtures according to the invention may also be used exclusively as primer or exclusively as finishing coat. If used as primer, the finishing coat may consist of the usual substances, e.g. nitrocellulose or polyurethanes in the case of leather. The polyurethanes may be applied as two-component lacquers, in which case they undergo further cross-linking with isocyanates, or they may be applied in the form of NCO prepolymers or unreactive polyurethane coats. If the mixtures according to the invention are used only as finishing coats, the substrate may be primed in known manner, e.g. with the usual aqueous dressing in the case of leather, but in this case one could equally well use other dressings as primers, e.g. polyurethanes.

Application of the products according to the invention is carried out by the methods conventionally employed for substances dissolved in organic solvents, namely application with air spray guns or airless spray guns, machine casting, roller application, application with coating knife or application by the reversal process. In the case of leather, ironing with rotary or hydraulic presses between applications and after the final application improves the smoothness and finish of the coated products. Drying and cross-linking of the individual applications may be carried out at normal temperature or by heating to about 180°C in drying chambers or drying channels. The quantities applied depend on the absorbency of the substrate and the effect desired but are normally between about 5 to 50 g/m².

EXAMPLE 1

A. Preparation of a Liquid Semiacetal in a Manner Analogous to DBP No. 1,092,002 a. 1495 Parts by weight of paraformaldehyde (49.8 mol) and 1596 parts by weight of methanol (49.8 mol) were heated to about 70°C with vigorous stirring. As soom as the reaction temperature reached 69°C, 10 parts by weight of normal aqueous sodium hydroxide solution were added all at once to the suspension. Depolymerization of paraformaldehyde then set in spontaneously. After filtration, the semiacetal $CH_3-O-CH_2OH$ was obtained as a low viscosity, water-clear liquid which was stable in storage.

b. 60 Parts by weight of paraformaldehyde in 118 parts by weight of isopropanol were depolymerized with 0.4 parts by weight of 2N sodium hydroxide aqueous solution as in a).

After filtration, the semiacetal

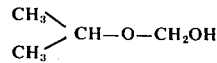

was obtained as a low viscosity, water-clear liquid which was stable in storage.

c. 30 Parts by weight of paraformaldehyde were depolymerized in 62 parts by weight of ethylene glycol in a manner analogous to a). The semiacetal

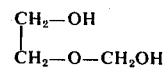

was formed.

d. 30 Parts by weight of gaseous formaldehyde were introduced into 32 parts by weight of methanol. The semiacetal $CH_3O-CH_2OH$ described under a) was obtained.

e. 60 Parts by weight of paraformaldehyde were depolymerized in 119 parts by weight of N-methyl-diethanolamine in a manner analogous to a).

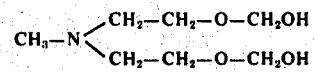

was obtained as a liquid which was stable in storage.

B. Preparation of a Higher Molecular Weight Diisocyanate (NCO Prepolymer)

200 Parts by weight (0.1 mol) of a polyester of adipic acid and ethylene glycol (OH number 56) were dehydrated at 120°C for 30 minutes and 44.4 parts by weight (0.2 mol) of 1-isocyanato-3,3,5-trimethyl-5-isocyanatomethylcyclohexane were then added at the same temperature in the course of the next 30 minutes. The NCO content of the prepolymer was 3.4% by weight.

C. Example According to the Known Art for Comparison

The NCO prepolymer prepared according to B) was diluted with 500 parts by weight of xylene and cooled to 25°C. 16.3 Parts by weight of 1-amino-3,3,5-trimethyl-5-aminomethylcyclohexane dissolved in 230 parts by weight of xylene and 314 parts by weight of isopropanol were added dropwise to this solution of NCO prepolymer in the course of 20 minutes with vigorous stirring. 30 Parts by weight (0.48 mol) of the liquid semiacetal prepared as described under A), a) and 2 parts by weight of dimethylbenzylamine were added immediately after termination of the chain lengthening reaction and methylolation was then carried out for 5 hours at 500°C.

A water-clear solution which contained about 19.6% by weight of high molecular weight solids was obtained. The solution had a viscosity of 575 cP at 25°C. The dissolved polyurethane polyureas were not methylolated. Even after 6 months' storage, formaldehyde titration carried out by Lemme's method in accordance with the following equation

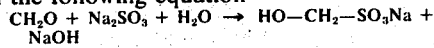

(Chem. Ztg. 27, 896 (1903))

showed the free formaldehyde content to be practically unchanged;

| | |
|---|---|
| CH$_2$O content found: | 1.062% by weight |
| original CH$_2$O content: | 1.07% by weight |

Although practically 0.5 mol of formaldehyde was used for about 0.2 NH equivalents of urethane groups and 0.4 NH equivalents of urea groups in the polyaddition product (total 0.6 NH equivalents) in this example, the polyaddition product could not be methylolated.

D. Process According to the Invention

The prepolymer obtained according to (B) was diluted with 100 parts by weight of toluene. A solution of 16.4 parts by weight of 1-amino-3,3,5-trimethyl-5-aminomethyl cyclohexane in 422 parts by weight of toluene and 522 parts by weight of tertiary butanol was added dropwise to this solution of NCO prepolymer in the course of 20 minutes with vigorous stirring. The solution was then stirred at room temperature for 10 minutes and 31 parts by weight (0.5 mol) of CH$_3$O—CH$_2$OH and 2 parts by weight of dimethylbenzylamine were then added immediately and the reaction mixture was heated to 55°C for 5 hours. A viscous, water-clear solution of a partially methylolated polyurethane-polyurea which contained about 20% by weight of high molecular weight solids was obtained. It was completely free from gel particles and was completely stable in storage over a tested period of 6 months without the addition of acid. The viscosity of the solution was 1200 cP/25°C.

Lemme's titration showed that of the total of 15 parts by weight of formaldehyde equivalents present in the solution before methylolation, 3 parts by weight had been bound by N-methylolation, i.e. about 16.6% of the NH groups of the polyaddition product were methylolated.

4 parts by weight of concentrated formic acid were added to the solution of methylolated polyurethane-polyurea and the solution was poured out on a glass plate to form a film which was then heated at 110°C for 8 minutes. A cross-linked, dimensionally stable film was obtained which was insoluble in dimethylformamide. By comparison, a film of polyaddition product which was not methylolated loses its shape in dimethyl formamide even at room temperature and goes into solution.

E. Gelatine Cross-linking and Adherence Properties of the Products Obtained According to the Invention This example shows the undiminished reactivity of N-methylol groups or of free formaldehyde present in the solutions of methylolated polyaddition products according to the invention with basic amino groups in high molecular weight polypeptides, using gelatine as a typical example.

An aqueous gelatine solution containing 8% by weight of gelatine was cast on a glass support to form a film about 0.2 mm in thickness which was dried overnight at room temperature. Using the gelatine film as support, the methylolated solution according to the invention described in (D) was applied as a coating of about 0.2 mm in thickness. The coated film was dried at room temperature for 25 hours, heated to 140°C for 10 minutes and then stored in water for several hours. The two-component film system was completely preserved, a sign that the lower layer consisting of gelatine had been completely cross-linked by formaldehyde and that the substrate which contained methylol groups adhered firmly to this cross-linked gelatine layer. A gelatine film which had been coated in analogous manner with a diisocyanate polyaddition product which was free from formaldehyde and contained no N-methylol groups was completely destroyed after only a short time in water because gelatine which is not cross-linked readily dissolves in water.

The products which are methylolated in accordance with the invention therefore result in improved adherence to polypeptide supports when used in the formation of films, a finding which is indirect evidence for improved adherence of a primer produced from such products to leather supports. Cross-linking of the upper layer of film can be proved by demonstrating that the film is insoluble in dimethylformamide.

EXAMPLE 2

The procedure was analogous to that described in Example 1 D) but the diisocyanate used for preparing the polyurethane was replaced by a. a mixture of 22.2 parts by weight of 1-isocyanato-3,3,5-trimethyl-5-isocyanatomethyl-cyclohexane and 16.8 parts by weight of hexamethylene diisocyante;
b. 37.6 parts by weight of xylylenediisocyanate;
c. 42 parts by weight of trimethylhexamethylene diisocyanate;
d. 58 parts by weight of an isocyanate telomer of hexamethylene diisocyanate and vinyl acetate prepared according to French Patent Specification No. 1,593,137 which contained 40% by weight of grafted polyvinyl acetate and which was dissolved in excess hexamethylene diisocyanate (NCO) content of the solution 29%; hexamethylene diisocyanate content 58% by weight);
e. 52.4 parts by weight of 4,4'-diisocyanatodicyclohexylmethane;
f. 50 parts by weight of 4,4'-diisocyanatodiphenylmethane;
g. 34.8 parts by weight of tolylene-2,4-diisocyanate.
The following chain lengthening agents were used:
a. 17 parts by weight of 1-amino-3,3,5-trimethyl-5-aminomethylcyclohexane;
b. 5 parts by weight of hydrazine hydrate;
c. 17 parts by weight of 1-amino-3,3,5-trimethyl-5-aminomethylcyclohexane;
d. 17 parts by weight of 1-amino-3,3,5-trimethyl-5-aminomethylcyclohexane;
e. a mixture of 8.5 parts by weight of 1-amino-3,3,5-trimethyl-5-aminomethylcyclohexane and 5.8 parts by weight of hexamethylene diamine;
f. 5 parts by weight of hydrazine hydrate;
g. 5 parts by weight of hydrazine hydrate.

The solvent used in (a) to (d) were 1 : 1 mixtures of toluene of xylene and tertiary-butanol; in (e), (f) and (g), the polyadditon was carried out in a 70 : 30 mixture of dimethylformamide and tertiary-butanol. Approximately 20% by weight solutions were prepared. N-methylolation was then carried out as described in Example 1D The percentage of methylolated NH groups was determined by titrating the free formaldehyde not bound in methylol groups:
a. 30.5%
b. 32.5%
c. 23 %
d. 28.5%
e. 18 %
f. 22 %
g. 24 %

The appoximately 20% by weight solutions had viscosities of 1200 to 1400 cP (a,b,c,d) or 700 – 900 cP (e,f,g) and could be cross-liked to form insoluble films in accordance with Example 1 D in the presence of catalytic quantities of maleic acid semiesters of 1 mol of maleic acid anhydride and 1 mol of n-butanol. Films obtained from solution (a) showed the very interesting property of undergoing cross-linking without any addition of acid even at room temperature. A film cast from solution (a) was completely insoluble in dimethylformamide within 24 hours after evaporation of the solvent mixture at room temperature.

EXAMPLE 3

This Example illustrates particularly clearly how the process according to the invention enables substantially linear methylolated polyurethane-polyureas with extremely high urea group contents to be produced without premature cross-linking and without the formation of gel particles.

a. 220 Parts by weight (0.1 mol) of a polyester of adipic acid and butane-1,4-diol with OH number 51 were reacted as described in Example 1 with 44.4 parts by weight (0.2 mol) of 1-isocyanato-3,3,5-trimethyl-5-isocyanatomethyl-cyclo-hexane to produce α, ω-diisocyanatoprepolymers which were then diluted with a solution of 44.4 parts by weight (0.2 mol) of 1-isocyanato-3,3,5-trimethyl-5-isocyanato-methyl-cyclohexane in 100 parts by weight of toluene at 95°C. The resulting solution contained 0.1 mol of a macrodiisocyanate and 0.2 mol of the monomeric 1-isocyanato-3,3,5-trimethyl-5-isocyanatomethylcyclohexane. A mixture of 620 parts by weight of toluene, 720 parts by weight of tertiary-butanol and 50 parts by weight of 1-amino-3,3,5-trimethyl-5-aminoethylcyclohexane was added dropwise to this prepolymer solution in the course of 20 minutes at 20° to 25°C with vigorous stirring. A viscous, water-clear solution of a polyurethane-polyurea which contained about 20 % by weight of high molecular weight solids was obtained (viscosity 1544 cP at 21°C). The concentration of

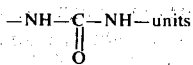

was approximately 10.2% by weight, based on polyurethane solids. The product was then methylolated with 100 parts by weight of the semiacetal $CH_3-O-CH_2OH$ and 4 parts by weight of endoethylene piperazine at 55°C. The solution obtained was completely free from bel particles.

When approximately 5 parts by weight of trifunctional lightfast biuret polyisocyanates or urethane-containing polyisocyanates of hexamethylene diisocyanate, 1-isocyanato-3,3,5-trimethyl-5-isocyanatomethylcyclohexane, 4,4'-diisocyanatodicyclohexylmethane, m-xylylene diisocyanate or 2,6-diisocyanatocaproic acid methyl ester are added to 100 parts by weight of the solutions obtained according to this example and the solutions are then cast as films on supports such as wood, sheet metal, textile fabrics, leather or synthetic resins such as polyvinyl chloride, polyurethanes or polyesters, firmly adhering, elastic, hard, cross-liked lacquer coatings with maximum light fastness and high chemical resistance are obtained.

If solutions of the polymeric film forming substances which have high urea group concentrations are applied to form films or coatings, etc., without the additional cross-linking agents mentioned above and then heated in the presence of acid, high quality films which are extremely resistant to solvents and lightfast are obtained due to chemical cross-linking or to physical cross-linking brought about by hydrogen bridge bonds between the urea groups. The films are not attacked either by toluene or by aliphatic hydrocarbons or by alcohols or mixtures of these solvents.

b. If chain lengthening is not carried out in toluene/tertiary butanol but in a mixture of dimethylformamide and tertiary butanol at an $NCO-NH_2$ ratio of 1.00, very high molecular weight polyureas are obtained in a smooth reaction. The viscosity of 20% solutions is 4850 cP at 21°C. After methylolation with methylene glycol monomethyl ether, the viscosity drops to 3200 cP. When films produced from this solution are heated in the presence of 0.5% by weight of a maleic acid semiamide of 1 mol of maleic acid anhydride and 1 mol of di-n-butylamine, cross-linked coatings which are insoluble in dimethylformamide are obtained.

EXAMPLE 4

This Example demonstrates the surprising result that methylolated polyurethane-polyureas which have extremely high urea group contents can be converted into completely non-tacky, pourable powders.

The solution obtained in Example 3) after methylolation was added dropwise to 1700 parts by weight of a solution of ε-caprolactam in $H_2O$ (molar ratio 1:6) with stirring.

400 parts by weight of water were added to the reaction mixture after the reaction. By the end of 5 hours, a non-sticky powder had settled at the bottom. It was filtered off and freed from ε-caprolactam by stirring it up with water several times.

10% Solutions of this dry powder in toluene/tertiary butanol (1:1) applied to wood, metal, synthetic resin, textile or leather supports dry to form elastic, hard and completely lightfast coatings which can be cross-linked by heat. The internal viscosity of 0.5% solutions of this powder in dimethylformamide is 0.85. When dry, the pourable, nontacky powder obtained can be cross-linked at 180°C to form insoluble shaped products.

EXAMPLE 5

200 parts by weight (0.1 mol) of a propylene glycol polyether with OH number 56 were dehydrated under vacuum at 130°C for 30 minutes and cooled to 110°C and 0.2 parts by weight of tin-II octoate and 44.4 parts by weight (0.2 mol) of 1-isocyanato-3,3,5-trimethyl-5-isocyanatomethyl-cyclohexane were then added. This caused the temperature to rise to 123°C within 1 minute. Prepolymer formation was completed after 4 minutes. The NCO prepolymers were then diluted with 100 parts by weight of toluene, the solution was cooled to 25°C and a solution of 11.6 parts by weight of hexamethylene diamine in 630 parts by weight of toluene and 314 parts by weight of tertiary butanol was added dropwise in the course of 20 minutes with stirring. The resulting water-clear solution of a polyurethane-polyurea which contained polyether segments was methylolated in a manner analogous to Example 1 D. The approximately 20% by weight solution obtained was completely free from gel particles and stable in storage and had a viscosity of 350 cP at 21°C. When the solution obtained according to this example is painted on glass, sheet metal, wood or synthetic resin supports and heated to 160°C after evaporation of the solvent, completely transparent, cross-linked coatings which are highly lightfast are obtained after 10 minutes.

EXAMPLE 6

The prepolymer obtained in Example 1 B was reacted in each case with 0.1 mol of the following chain lengthening agents in a manner analogous to Example 1 D:

a. m-xylylene diamine (13.6 parts by weight);
b. 4,4'-diaminocyclohexane (11.4 parts by weight);
c. hydrazine hydrate (5 parts by weight).

The products were then methylolated with the following compounds:

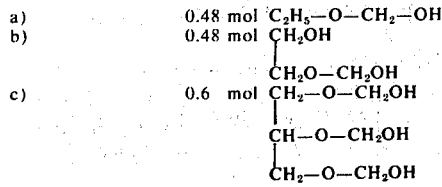

in the course of 4 hours at 50°C in the presence of 2 parts by weight of trimethylhexahydrotriazine. Completely clear solutions which were stable in storage and completely free from gel particles were again obtained. They contained approximately 19% of high molecular weight, partly methylolated polyurethanepolyureas or polyurethane-polyhydrazodicarbonamides and had the following viscosities:

a. 950 centipoises/25°C
b. 1150 centipoises/25°C
c. 930 centipoises/25°C

When 100 parts by weight of the methylolated high molecular weight polyurethane-polyurea or polyurethane-polyureapolyhydrazodicarbonamide solutions prepared in this Example, 5 parts by weight of a biuret triisocyanate obtained from 3 mols of hexamethylene diisocyanate or 3 mols of 1-isocyanato-3,3,5-trimethyl-5-isocyanatomethyl-cyclohexane and 1 mol of water are rapidly stirred together and the mixtures are painted on glass, sheet metal or wood, soft, abrasion resistant, cross-linked lacquers or coatings with maximum light fastness are obtained.

EXAMPLE 7

A prepolymer was prepared in a manner analogous to Example 1 B from 167 parts by weight of a polyester of adipic acid, dimethylpropane-2,2-diol and hexanediol (molar ratio 1:1:1.2) which had a molecular weight of 1670 and 44.4 parts by weight of 1-isocyanato-3,3,5-trimethyl-5-isocyanatomethylcyclohexane. The prepolymer was taken up with 100 parts by weight of toluene and after the addition of a further 22.2 parts by weight of the same monomeric diisocyanate the mixture of diisocyanate and prepolymer was introduced dropwise at room temperature into a solution of 42 parts by weight of 4,4-diaminodicyclohexylmethane in 451 parts by weight of toluene and 551 parts by weight of tertiary butanol. 33 parts by weight of the liquid semiacetal $CH_3-O-CH_2OH$ and 1 part by weight of dimethylbenzylamine were then added to the resulting approximately 20% solution of polyaddition product which had a viscosity of abouot 3780 cP at 25°C, and the reaction mixture was methylolated for 1½ hours at 50°C.

The methylolated solution had a viscosity of 2852 cP at 25°C.

Films produced from the solution can be cross-linked by heating to about 120°C and when cross-linked they swell only by about 8 to 9% in length and width in perchloroethylene.

EXAMPLE 8

The procedure was analogous to that employed in Example 7 but instead of the diisocyanate used in that Example, an equivalent quantity of 4,4'-diisocyanatodicyclohexylmethane was used and no monomeric diisocyanate was added before chain lengthening. Chain lengthening was carried out with 17 parts by weight of 1-amino-3,3,5-trimethyl-5-aminomethyl-cyclohexane.

The solution had a viscosity of 577 cP/25°C after methylolation.

Films produced according to this Example have excellent fastness to light and can be cross-linked by storage at room temperature for 4 months even without the addition of acid. After this time, samples of film are insoluble even in boiling dimethylformamide. They swell much less in dimethylformamide than films which have not been cross-linked. After the films have been cross-linked, the amount to which they change in length and width due to swelling in trichloroethylene is only about 55% (film before cross-linking: approximately 102%).

EXAMPLE 9

A polyurethane-polyurea was prepared in a manner analogous to Example 1 D from 200 parts by weight of a polyester of adipic acid and ethylene glycol with OH number 56 and
 a. a mixture of 22.4 parts by weight of 1-isocyanato-3,3,5-trimethyl-5-isocyanatomethyl-cyclohexane and 16.8 parts by weight of hexamethylene diisocyanate or
 b. 37.6 parts by weight of m-xylylene diisocyanate or
 c. 42 parts by weight of trimethylhexamethylenediisocyanate or
 d. 58 parts by weight of an isocyanate telomer prepared according to French Patent Specification No. 1,593,137 from hexamethylene diisocyanate and vinyl acetate, this telomer containing 40% by weight of grafted polyvinyl acetate and being dissolved in excess hexamethylene diisocyanate (NCO content of the solution 29%; hexamethylene diisocyanate content 58% by weight); or
 e. a mixture of 25 parts by weight of 4,4'-diisocyanatodiphenylmethane and 22.4 parts by weight of 1-isocyanato-3,3,5-trimethyl-5-isocyanatomethyl-cyclohexane; or
 f. a mixture of 17.4 parts by weight of 1-methylbenzene-2,4-diisocyanate and 22.4 parts by weight of 1-isocyanato-3,3,5-trimethyl-5-isocyanatomethyl-cyclohexane; and
in each case 16.5 parts by weight of 1-amino-3,5,5-trimethyl-5-aminomethylcyclohexane as chain lengthening agent, using a mixture of 250 parts by weight of dimethylformamide and 250 parts by weight of tertiary-butanol as solvent. The polyurethane polyurea was then methylolated in each case with 0.48 mol (30 parts by weight) of $CH_3$—O—$CH_2OH$ and 2 parts by weight of trimethylhexahydrotriazine for 3 hours. The solutions obtained were stable in storage and had the following viscosities:
 a. 750 cP/25°C
 b. 1350 cP/25°C
 c. 810 cP/25°C
 d. 1400 cP/25°C
 e. 1380 cP/25°C
 f. 1200 cP/25°C

EXAMPLE 10

A neat's grain leather which had been predyed with aniline dye in the vat and then chrome tanned was primed by spraying with a primer consisting of 150 parts by weight of the 20% by weight solution of methylolated polyurethane-polyurea described in Example 1 D, 600 parts by weight of methyl ethyl ketone, 170 parts by weight of ethyl glycol and 80 parts by weight of toluene. This primed aniline leather was then finished by spraying it with the following dressing:

110 parts by weight of the methylolated polyurethane-polyurea solution prepared in Example 1 D which had been used as primer,
80 parts by weight of a 10% solution in ethyl acetate of commercial ester-soluble collodion cotton which had a viscosity of 5000 cP when measured as a 10% solution in butyl acetate (purity: 98/100%),
570 parts by weight of methyl ethyl ketone,
160 parts by weight of ethyl glycol and
80 parts by weight of toluene.

After several minutes' drying at 60°C, a coating with a silky gloss was obtained which did not impair the natural appearance of the dyed leather but reduced its sensitivity to wet and dirt.

EXAMPLE 11

A retanned chromed neat's leather was primed by plush pad application of an aqueous primer consisting of 200 parts by weight of a commercial casein-containing
 leather paint which contained 55% of titanium dioxide, 6% of casein and 18% of the usual plasticizers used for casein,
 180 parts by weight of a commercial aqueous polymer dispersion containing 40% of a copolymer of butadiene and acrylonitrile and
620 parts by weight of water, followed by ironing at 70°C and 150°C and another plush pad application. Priming was then completed by twice spraying the leather with a second primer composition consisting of 100 parts by weight of the primer composition described above, 70 parts by weight of a commercial casein solution plasticized with the usual casein plasticizers, 120 parts by weight of the polymer dispersion used in the plush formulation and 710 parts by weight of water, followed by ironing at 70°C and 150°C.

The methylolated polyester-polyurethane-polyurea solution described in Example 1 D was then applied to this primed leather by two light spray applications. A leather dressed with an equivalent quantity of a polyaddition product which had not been methylolated was not only less lightfast and heat resistant but also considerably inferior in its resistance to scuffing and adherence to the primer.

Any of the other organic diisocyanates, chain extenders, polyols, solvents, tertiary alcohols and other components indicated herein as suitable for use in practicing the invention may be substituted for those used in the foregoing examples.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:
1. A process for N-methylolating a polyurethane comprising reacting
 a. a polyurethane containing about 0.2 to 0.4 NH equivalents obtained from urea groups for every 200 parts by weight of polyurethane with
 b. between 0.1 to 10 equivalents of formaldehyde per methylolatable NH equivalent, dissolved in a solvent mixture of
 c. an inert organic solvent selected from the group consisting of benzene, toluene, xylene, ethyl benzene, chlorobenzene, tetrahydrofuran, dioxane, 1,3-dioxalene, glycol carbonate, ethyl glycol ace- tate, methylene chloride, chloroform and trichloroethylene and d. a tertiary alcohol at a temperature of between about −20° and 160°C.

2. A process of N-methylolating a polyurethane comprising reacting
   a. a polyurethane containing about 0.2 to 0.4 NH equivalents obtained from urea groups for every 200 parts by weight of polyurethane, with
   b. 0.1 to 2 equivalents of formaldehyde per methylolatable NH equivalent, in a solvent mixture of
   c. an inert organic solvent selected from the group consisting of benzene, toluene, xylene, ethyl benzene, chlorobenzene, tetrahydrofuran, dioxane, 1,3-dioxalene, glycol carbonate, ethyl glycol acetate, methylene chloride, chloroform and trichloroethylene, and
   d. about 5 to 95 wt%, based on the total weight of solvent, of a tertiary alcohol at a temperature of between −20°C and 160°C.

3. The process of claim 2 wherein 0.3 to 1.5 equivalents of formaldehyde per methylolatable NH equivalent are used, the solvent mixture contains 10 to 90 wt% tertiary butanol and the reaction is carried out at 20° to 70°C.

4. The product of the process of claim 1.

5. The product of the process of claim 2.

6. The process of claim 2 wherein the formaldehyde is produced in the reaction mixture from a compound adapted to release formaldehyde.

7. The process of claim 6 wherein the compound which releases formaldehyde is a semiacetal of formaldehyde.

8. The process of claim 7 wherein N-methylol-caprolactam, N-methylol-butyrolactam or N-methylol-valerolactam is included along with the said semiacetal.

9. The process of claim 2 wherein the polyurethane is a polyurethane-urea, polyurethane polyamide, polyurethanepolyurea-polyhydrazodicarbonamide, or a polyurethane-polyhydrazodicarbonamide.

* * * * *